US008467155B2

(12) United States Patent
Kroeker et al.

(10) Patent No.: US 8,467,155 B2
(45) Date of Patent: Jun. 18, 2013

(54) CONTACT PROTECTION CIRCUIT AND HIGH VOLTAGE RELAY COMPRISING THE SAME

(75) Inventors: Matthias Kroeker, Mittenwalde-Ragow (DE); Joerg Einhorn, Berlin (DE); Gilles Gozlan, Le Mesnil Theribus (FR)

(73) Assignee: Tyco Electronics AMP GmbH, Bensheim (DE)

( * ) Notice: Subject to any disclaimer, the term of this patent is extended or adjusted under 35 U.S.C. 154(b) by 19 days.

(21) Appl. No.: 13/182,380

(22) Filed: Jul. 13, 2011

(65) Prior Publication Data

US 2012/0013200 A1 Jan. 19, 2012

(30) Foreign Application Priority Data

Jul. 16, 2010 (EP) .................................... 10290404

(51) Int. Cl.
*H02H 3/00* (2006.01)
*H02H 7/00* (2006.01)

(52) U.S. Cl.
USPC ............................ 361/2; 361/3; 361/4; 361/5

(58) Field of Classification Search
USPC .............................................................. 361/2
See application file for complete search history.

(56) References Cited

U.S. PATENT DOCUMENTS 5,805,393 A * 9/1998 Thomas ............................ 361/6

FOREIGN PATENT DOCUMENTS

| | | | |
|---|---|---|---|
| DE | 2128161 | A1 | 12/1972 |
| EP | 0744761 | A2 | 11/1996 |
| WO | WO 0030137 | | 5/2000 |

OTHER PUBLICATIONS

European Search Report issued by the European Patent Office, dated Nov. 30, 2010, for EP10290404, 5 pages.

* cited by examiner

*Primary Examiner* — Dharti Patel
(74) *Attorney, Agent, or Firm* — Faegre Baker Daniels LLP

(57) ABSTRACT

The invention provides a switching device having a contact protection circuit for arcing suppression. The switching device comprises a main relay for interrupting a load path and a dual coil auxiliary having a high resistance coil and a low resistance coil that operate the switching of an auxiliary contact. The auxiliary contact is connected in series with a PTC device and the low resistance coil of the auxiliary relay in a series arrangement. The series arrangement is connected in parallel to the main contact. When the main relay opens, the auxiliary contact is maintained closed during a given time interval due to the magnetic flux generated by the low resistance coil. The given time interval depends on the transition of the PTC device to trip state. In another configuration, the dual coil relay is substituted by two auxiliary relays.

15 Claims, 4 Drawing Sheets

CONTACT PROTECTION CIRCUIT AND HIGH VOLTAGE RELAY COMPRISING THE SAME

TECHNICAL FIELD OF THE INVENTION

The present invention relates to electrical switches, and more specifically, to contact protection circuits for suppressing arcing and switching devices such as high voltage relays comprising the same.

BACKGROUND OF THE INVENTION

Electrical switches are commonly used to control the flow of current in electrical circuits.

Common types of electrical switches comprise mechanical contacts that can be made to open or close by manual operation or in response to an actuating mechanism, such as electrical actuation, magnetic induction, thermal activation, etc. These types of electrical switches, also called mechanical switches, can be found in various switching devices such as relays, circuit breakers, and ground fault interrupts.

Without further measures, normal switches could only separate 12 to 20 V DC. However, even if this limit can be shifted to higher voltages by the application of external magnets, the power dissipation in the unavoidable arc when the switch contacts are separated erodes the contact material and therefore limits the lifetime of the switching device.

The high temperatures reached during arcing may also cause melting of the contact portions or transfer of material between contacts which result in contact wear. The contacts may develop uneven surfaces that mechanically lock the contacts when the switch is operated to open.

Another undesirable effect of arcing is the contamination of the areas surrounding the switch due to the evaporation and sputtering of contact material.

The overheating associated with arcing might also damage the surrounding areas and lead to the destruction of the device.

Arcing is particularly important in switching devices such as high voltage relays used for protecting electrical circuits from faulty conditions and/or disconnecting them from high voltage power supplies.

The high electric field established across the air gap between the switch contacts when these are separated for interrupting the supply of high voltage power to an electrical load produces an intense arc current between the separated contacts that may destroy the switch as well as the circuits to be protected.

Thus, it is desirable to limit the effects of arcing as much as possible such as to improve the reliability and lifetime of the mechanical switch as well as to avoid destruction and/or device contamination.

Several measures have been proposed for protecting relay contacts and which rely on dissipating the high energy generated across the opened relay via arrangements of electric components, such as resistors, diodes, capacitors, connected in series or in parallel to the relay contacts. The suitable arrangement depends on the type of relay and its specific application.

A positive temperature coefficient of resistance device, also called a positive temperature coefficient thermistor or simply PTC device, such as the devices sold by Tyco Electronics Corporation under the trademark PolySwitch, is another example of passive component that has been proposed for protecting contacts from arcing.

PTC devices are generally used for providing electrical circuit protection against faulty conditions, such as overcurrents through the PTC device or excessive surrounding temperatures. Commonly used PTC devices are based on conductive polymer compounds.

The interesting characteristic of these devices lies in their non-linear resistance behavior. A PTC device has a current rating, above which it changes from a low temperature, low resistance state, also called the on-state or un-tripped state, into a high temperature, high resistance state, that causes the current flowing through the PTC device to be greatly reduced. The PTC device is then said to be in a tripped state or simply "tripped".

The rated trip current may vary from 20 mA to 100 A, depending on the type of PTC device. The transition to the tripped state may also occur if a current larger than the trip current is maintained through the PTC device for more than a given time.

In order to return the PTC device to the low resistance state, the PTC device has to be disconnected from the power source and allowed to cool, even if the current and/or temperature have return to normal levels.

U.S. Pat. No. 5,864,458 describes an example of overcurrent protection system that permits the use of mechanical switches and PTC devices to switch voltages and currents in normal circuit operations, while the voltage and/or current ratings of the mechanical switches and PTC devices are much less than the normal operating voltages and currents of the circuits.

The overcurrent protection circuit comprises a PTC device connected in series with a load, and a bimetal switch connected in parallel with the PTC device, which are thermally coupled.

The PTC device and bimetal switch serve to limit the fault current delivered to the circuit. In case of an overcurrent, the bimetal switch heats and opens, shunting the current to the PTC device. The overcurrent in the PTC device causes the PTC device to quickly trip to its high resistance state, reducing the current to a very low level. The low current in the PTC device keeps the PTC device heated and in a high resistance state. The heat from the PTC device latches the bimetal switch in the open state, preventing oscillation of the contacts of the bimetal switch.

By shunting the current to the PTC device, the contacts of the bimetal switch do not arc since they do not have to switch the current at operating voltage.

U.S. Pat. No. 5,737,160 proposes electrical switch arrangements for interrupting a current and voltage higher than the rated currents and voltages of each of the switches and the PTC devices.

The electrical switch arrangements comprise two mechanical switches in series or in parallel, and a PTC device which is connected in parallel with one of the switches (referred to as "the parallel switch"), and in series with the other switch (referred to as "the series switch").

The design of the arrangement depends on the speed at which the resistance of the PTC device increases. If both switches are operated simultaneously, the current will continue to flow through the series switch, in the form of an arc between the contacts, until the increasing resistance of the PTC device reaches a level such that the arc is not sustained.

The use of a PTC device that quickly reaches that level may lower the required rating of the series switch.

If the series switch is operated after the parallel switch, the duration of the arcing in the series switch may be reduced and/or completely eliminated. Thus, there will be no arcing in the series switch if the resistance of the PTC device reaches the required level before the series switch opens.

However, a problem remains on how to ensure that the delay between the operation of the two switches is sufficient but not longer than required for suppressing arcing.

For instance, if the series switch is not operated (i.e. opened) as soon as the resistance of the PTC device reaches the required level, the PTC device must be able to sustain the full voltage in a high temperature state, without damaging itself or any other component, until the series switch is operated. Otherwise, the PTC device may be damaged or cause damage to other components.

The series switch should open and/or be operated shortly after the parallel switch for ensuring that the circuit is not live for an appreciable time after the parallel switch has been operated.

In order to avoid this problem, the characteristics of the PTC device and the rated voltage of the switches are selected so as to control the speed at which the PTC reaches the required level. However, this has the disadvantage that the electrical switch arrangement must be customized for each specific application.

In particular, the characteristics of PTC devices may change considerably among devices of the same type. Thus, a switching mechanism that allows for compensation of changes among PTC devices would also be desirable.

Finally, although the above proposed measures allow the reduction of the effective current/voltage at which the switches are opened for avoiding arcing, at present there are no solutions regarding how to control the time delay between operations of the switches and how to synchronize the switching tripping of the PTC and the galvanic isolation sequence.

SUMMARY OF THE INVENTION

The present invention aims at overcoming the disadvantages and shortcomings of the prior art techniques and an object thereof is to provide a contact protection circuit for suppressing an arc in mechanical switches and a high voltage relay having extended lifetime of the relay contacts.

This object is solved by the subject matter of the independent claims. Advantageous embodiments of the present invention are defined by the dependent claims.

The present invention provides a switching device, comprising a main switching mechanism comprising a main switch for electrically interrupting a flow of current through a load path; an auxiliary switching mechanism comprising an auxiliary switch; and a PTC device connected with the auxiliary switch in a series arrangement, the series arrangement being connected in parallel to the main switch; wherein the auxiliary switching mechanism is adapted to maintain the auxiliary switch closed during a given time interval after the main switch is operated to open, the given time interval depending on a transition of the PTC device from a low resistance state to a high resistance state.

Thus, by using an auxiliary switching mechanism that controls the time the auxiliary switch remains closed, the opening of the main switch and of the auxiliary switch can be automatically coordinated. Further, by delaying in time the opening of the auxiliary switch based on the characteristics of the PTC device, such as trip current and a speed for changing into the trip state, the present invention limits the time the auxiliary switch remains closed and still ensures that the current flowing through the auxiliary switch is sufficiently decreased below a safe value for which arcing is negligible or suppressed before the auxiliary switch is opened.

In a further development, the auxiliary switching mechanism is adapted to open the auxiliary switch when the PTC device trips to the high resistance state.

In a further development of the invention, the PTC device has a maximum high resistance trip current such that arcing is suppressed in the auxiliary switch at a current intensity below said maximum high resistance trip current.

Since the current through the PTC device is greatly reduced when the PTC device trips to the high resistance state, the auxiliary switch can then be safely opened on a significantly reduced arcing current level.

According to a further embodiment, the main switching mechanism and the main switch are provided as a main relay.

This allows operating the main switch using lower voltage circuits that are electrically isolated from the high voltage circuit to be interrupted.

According to a further development, the main relay comprises a main coil for operating the main switch via an energizing coil voltage, and a main coil protective element connected to the terminals of the main coil and adapted to control the decay of magnetic inductance stored in the main coil when the energizing coil voltage is set to zero.

The main coil protective element may be a high resistance resistor for dissipating quickly the remnant flow of current in the main coil. Thus, the contacts of the main switch open faster.

According to a further development, the auxiliary switching mechanism comprises a first coil for operating the auxiliary switch via an energizing coil voltage; and a first coil protective element connected to the terminals of the first coil and adapted to control the decay rate of the magnetic inductance stored in the first coil when the energizing coil voltage is set to zero.

It is then ensured that the auxiliary switch will not open prior to the main switch.

According to a further development the auxiliary switching mechanism comprises a second coil that is connected in series with the auxiliary switch and the PTC device, the second coil being adapted to maintain the auxiliary switch closed during said given time interval after the main switch is opened.

This has the advantage that the auxiliary switch is maintained automatically closed while the current flowing in the series arrangement is strong enough for producing arcing, and is automatically opened when this current falls below safe values.

According to a further development, the auxiliary switching mechanism is provided as a dual coil relay that comprises the auxiliary switch, the first coil and the second coil.

According to another development, the auxiliary switching mechanism is provided as a first auxiliary relay and a second auxiliary relay, the first auxiliary relay comprises the first coil and a first auxiliary contact, the second auxiliary relay comprises the second coil and a second auxiliary contact, the first auxiliary contact and the second auxiliary contact being connected in parallel to form the auxiliary switch.

By providing the functions of the first and second coils in separate relays, it is no longer required a dielectric insulation between the two coils.

In a further development of the invention, the second coil is a current sensitive coil.

According to a configuration, the main coil and the first coil are voltage sensitive coils.

According to an embodiment, the main coil and the first coil are connected in a serial manner such that they are energized by a single energizing voltage circuit.

In an alternative embodiment, the main coil and the first coil are connected in a parallel manner such that each coil is energized with a same energizing voltage, and the device further comprises a decoupling element connected in series with the first coil and adapted to electrically decouple the main coil and the first coil when the energizing voltage is disconnected.

This has the advantage that the same voltage circuit may be used for energizing both the main and the first coils. Thus, the operation of the switching device is simplified. Further, the operation of the two coils becomes synchronized in time.

The present invention also provides a contact protection circuit for arc suppression, comprising: a main switch for interrupting a flow of current through a load path of an electrical circuit; an auxiliary switch; a PTC device; and a current sensitive coil adapted to operate the auxiliary switch.

The auxiliary switch, the PTC device and the current sensitive coil are connected in a series arrangement, and the series arrangement is connected in parallel to the main switch. In addition, if the main switch is operated to interrupt the flow of current through the load path while the auxiliary switch is closed, the auxiliary switch is maintained closed by the current sensitive coil during a given time interval after the main switch opens.

The given time interval depends on a transition of the PTC device from a low resistance state to a high resistance state.

The present invention also provides a method for arc suppression in a switching device using a serial combination of a current sensitive coil, an auxiliary switch, and a PTC device, connected in parallel to a main switch, the method comprising the steps of: operating the main switch to interrupt a flow of current through a load path while maintaining the auxiliary switch closed for deviating the flow of current through the serial combination; using the electromagnetic force generated by the current that flows through the current sensitive coil for maintaining the auxiliary switch closed; and causing a transition in the PTC device from a low resistance state to a high resistance state after a given time required for a current flowing through the serial arrangement falling below a rated current of the auxiliary switch.

BRIEF DESCRIPTION OF THE FIGURES

The accompanying drawings are incorporated into and form a part of the specification for the purpose of explaining the principles of the invention. The drawings are not to be construed as limiting the invention to only the illustrated and described examples of how the invention can be made and used.

Further features and advantages will become apparent from the following and more particular description of the invention as illustrated in the accompanying drawings, in which.

DETAILED DESCRIPTION OF THE EMBODIMENTS

Advantageous embodiments of the present invention will now be described in further detail with reference to the accompanying drawings.

Figure 1:
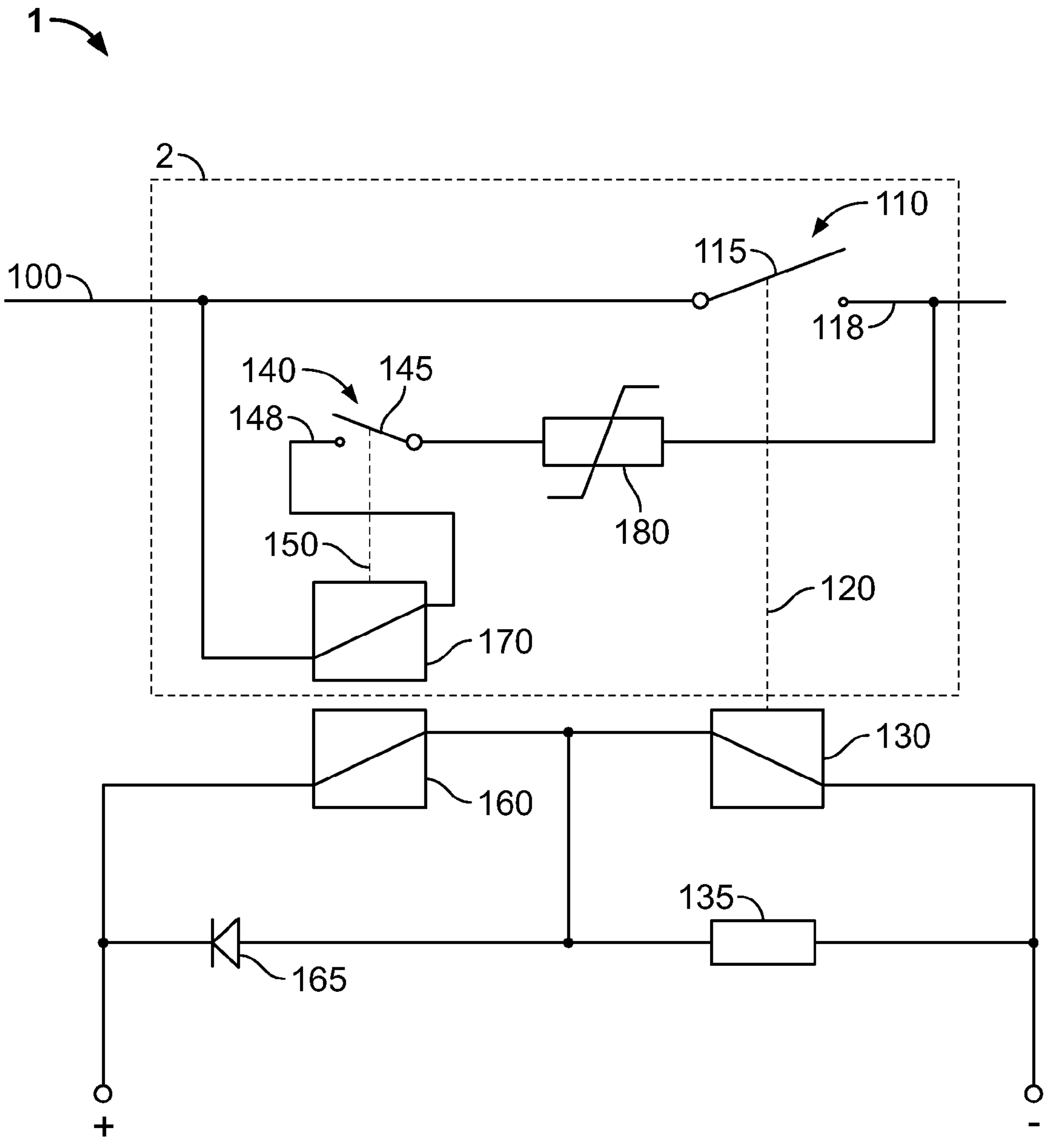
FIG. 1 shows a switching device having an arc suppression circuit according to an exemplary embodiment of the present invention.

FIG. 1 shows a switching device 1 having an arc suppression circuit according to an exemplary embodiment of the present invention.

The switching device 1 can be connected in series between an electrical power supply and an electrical load (not shown) for controlling the flow of current through a load path 100.

The switching device 1 has a main switch 110 for electrically interrupting a flow of current through the load path 100 and a main switching mechanism for operating the main switch.

In the illustrated embodiment, the main switching mechanism together with the main switch 110 forms a main relay 120. The main switch 110, which will be referred to as main contact 110, is a mechanical switch having a movable contact member 115 and a fixed contact member 118. However, other contact combinations suitable for the same purpose may be used.

The movable contact member 115 is directly actuated by the main relay 120 to move between a closed state, in which a tip of the movable contact member 115 contacts the fixed contact 118 for electrically closing the load path 100 (the main relay is closed), and an open state in which the movable contact member 115 is separated from the fixed contact 118 by an air gap that electrically interrupts the load path 100 (the main relay is opened).

The main relay 120 has an electromagnet coil, simply referred to thereof as main coil 130, which directly actuates the movable contact member 115 of the main contact 110 via the electromagnetic effects produced in this member by the flow of current in the windings of the main coil 130.

The main contact 110 can then be operated by a coil energizing circuit (not shown), preferably a low voltage circuit, that is electrically isolated from the power supply and the electrical load circuit to which the switching device 1 is to be connected. When an energizing coil voltage is applied at the main coil terminals, the current in the main coil windings generates an electromagnetic force sufficient to force the main contact 110 to close and/or to remain closed. When the coil voltage is disconnected, that is, set to zero, the induced electromagnetic force ceases. As a result, the main contact 110 opens.

When the main contact 110 is operated to open for interrupting a flow of current generated by a high voltage in the load path 100, the voltage drop across the opened contacts starts to increase and may cause arcing. In order to avoid formation of an arc current over the separated contacts of the main contact 110, the switching device 1 has an arc suppression circuit 2.

The arc suppression circuit 2 comprises the main contact 110 and a bypass circuit 125 connected in parallel to the main contact 110. The bypass circuit 125 includes a PTC device 180 connected in series to an auxiliary switch 140. The auxiliary switch 140 is preferably in a closed state when the main switch 110 opens.

Thus, while the main switch 110 is the mechanism that interrupts the load path 100 at full current and when the voltage across the main contact 110 is reduced, the auxiliary switch 140 is operated to open at a later stage when the current flowing through the bypass 125 has been significantly reduced as will be described below. Thus, the arc protection circuit 2 allows using a main switch 110 and an auxiliary switch 140 characterized by a significantly lower rating voltage than the voltages at which the main and auxiliary switches are operated.

Similarly to the main contact 110, the auxiliary switch 140 is preferably a mechanical switch having a fixed contact member 148 and a movable contact member 145 that can be directly actuated for making its tip to touch the fixed contact member 148 or to move away from the fixed contact member 148 for closing or opening the auxiliary contact 140, respectively.

The PTC device 180 allows dissipating the power accumulated across the main contact 110 and reducing the current flowing in the bypass 125 to safe values before the auxiliary switch 140 is opened by changing its resistance state from a low resistance state into a high resistance state. The transition into the high resistance state occurs when the current flowing through the bypass 125 reaches a low level current.

In order to coordinate the time when the auxiliary switch 140 can be safely opened and the high voltage circuit disconnected, the switching device 1 comprises an auxiliary switching mechanism for operating the auxiliary switch 140.

The auxiliary switching mechanism should preferably maintain the auxiliary switch 140 closed when the main contact 110 is opened or be able to close it immediately before so that a current might start to flow through the bypass circuit 125 and avoid the formation of arc current at the main contact 110.

In the present embodiment, the auxiliary switch 140 and the auxiliary switching mechanism are provided as an auxiliary relay 150.

The auxiliary relay 150 is a dual coil relay system comprising the auxiliary switch 140, hereinafter referred to as auxiliary contact, and two electromagnet coils: a first coil 160, which is preferably a high resistance coil sensitive to voltage (voltage sensitive), and a second coil 170, which is preferably a low resistance coil sensitive to current (current sensitive).

The dual coil relay system provides a dual actuating mechanism for operating the auxiliary contact 140 at different operation states of the main relay 120.

The first coil 160 of the auxiliary relay 150 provides the main actuating mechanism for closing and/or maintaining the auxiliary contact 140 closed when the main relay 120 is closed. The second coil 170 maintains the auxiliary contact 140 closed during a certain time after the main relay 120 opens.

Similarly to the actuation of the main coil 130, when an energizing coil voltage is applied at the first coil 160 terminals, the electromagnetic force generated by the current flowing in the first coil windings forces the auxiliary contact 140 to close and/or to remain closed.

This electromagnetic force ceases when the energizing coil voltage of the first coil 160 is disconnected or set to zero. In this case, the second coil 170 provides an additional electromagnetic force for maintaining the auxiliary contact 140 closed under certain circumstances as will be explained later.

In order to better coordinate the opening/closing of the main relay 120 with the opening/closing of the auxiliary relay 150, the main coil 130 and the first coil 160 of the auxiliary relay 150 are electrically connected to the same energizing voltage circuit.

In the present embodiment, the main coil 130 and the first coil 160 are connected in a series arrangement. The positive (+) and negative (−) terminals of this serial coil arrangement can then be connected to an external voltage circuit for energizing the coils (not shown). Since the two coils are then energized by the same voltage circuit, the actuation of the main coil 130 and the first coil 160 for closing the main and auxiliary contacts, respectively, can be done in a substantially synchronous manner and using a single control circuit.

Since the magnetic induction stored in an electromagnet coil does not decay immediately after the energizing coil voltage is disconnected, there is a non-zero time delay between the time instant when the energizing coil voltage is set to zero and the time instant when the actuated relay contact effectively opens.

In order to control this time delay, the main coil 130 may be terminated with a high resistance resistor 135 for causing the current still flowing in the main coil 130 to decay at a faster rate. As a consequence, the main contact 110 will open faster.

The high resistance resistor 135 also prevents the occurrence of high voltage peaks at the moment of switch-off, which could damage parts of the control circuit; therefore, it serves as a coil protective element.

However, other electronic components may be used for the same protective purpose and/or for controlling the decay rate of the electromagnetic force produced by the coil after the energizing voltage is disconnected.

As shown in FIG. 1, the high resistance resistor 135 is connected in parallel to the terminals of the main coil 130.

The first coil 160 of the auxiliary relay 150 may also be terminated by a first coil protective element 165, preferably connected in parallel to the first coil terminals, for controlling the decay rate of the current remaining in the first coil 160 when the energizing coil voltage is disconnected.

In addition, although the first coil 160 of the auxiliary relay 150 is energized by the same external voltage circuit as the main relay 120, the opening of the auxiliary contact 140 may be delayed in time with respect to the opening of the main contact 110 by selecting the first coil protective element 165 such as to cause the decay rate of the remnant current flow in the first coil 160 to be slower than the decay rate in the main coil 130.

In the illustrated embodiment, the high resistance coil 160 of the auxiliary relay 150 is terminated/clamped with a diode 165, which serves as the first coil protective element. The remnant current in this coil, and therefore the generated electromagnetic force, will decay at a slower pace than in the main coil 130.

Thus, when the switching device 1 is connected to a high voltage circuit and the main relay 120 opens for interrupting the current flowing through the load path 100, it can be ensured that the auxiliary contact 140 will not open prior to the main contact 110.

As illustrated in FIG. 1, the diode 165 is connected in parallel to the terminals of the first coil 160 and in such a manner that the passage of current through the diode 165 is blocked when the energizing voltage is applied to the serial arrangement constituted by the main coil 130 and the first coil 160.

In addition, the resistance of the main coil protective element 135 may be selected such as to cause the energizing current to flow essentially through the first coil 160 and the main coil 130 when the energizing voltage is applied to the serial coil arrangement.

The second coil 170 of the auxiliary relay 150 provides the main actuating mechanism for closing and/or maintaining the auxiliary contact 140 closed for a certain amount of time when the main relay 120 is open, as will be explained with reference to FIGS. 2A, 2B and 2C. This delay depends on the characteristics of the PTC device 180.

As shown in FIG. 1, the second coil 170 of the auxiliary relay 150 is connected in series with the auxiliary contact 140 and the PTC device 180, and is disposed with respect to the auxiliary contact 140 such as to use the current that flows through the bypass 125 or generating an electromagnetic force that actuates the auxiliary contact 140.

The second coil 170 is selected such as to produce an additional electromagnetic force that maintains the auxiliary contact 140 closed, and after the electromagnetic force produced by the first coil 160 already ceased, until the current flowing through the bypass 125 reaches safe values for which the auxiliary contact 140 can be opened without or with reduced arcing.

Figure 2A:
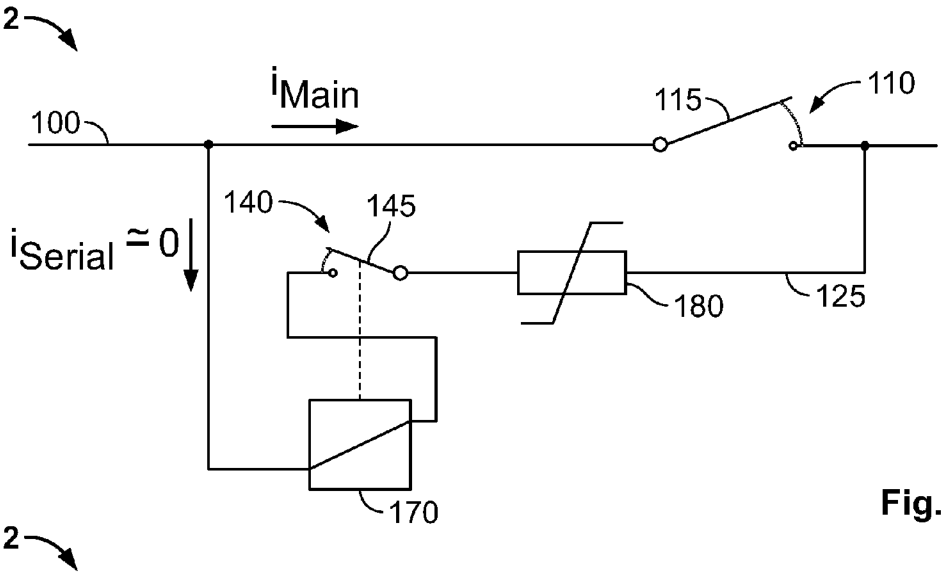
FIGS. 2A, 2B and 2C illustrate an arc suppression circuit at different operating states according to an exemplary embodiment of the present invention.
Figure 2B:
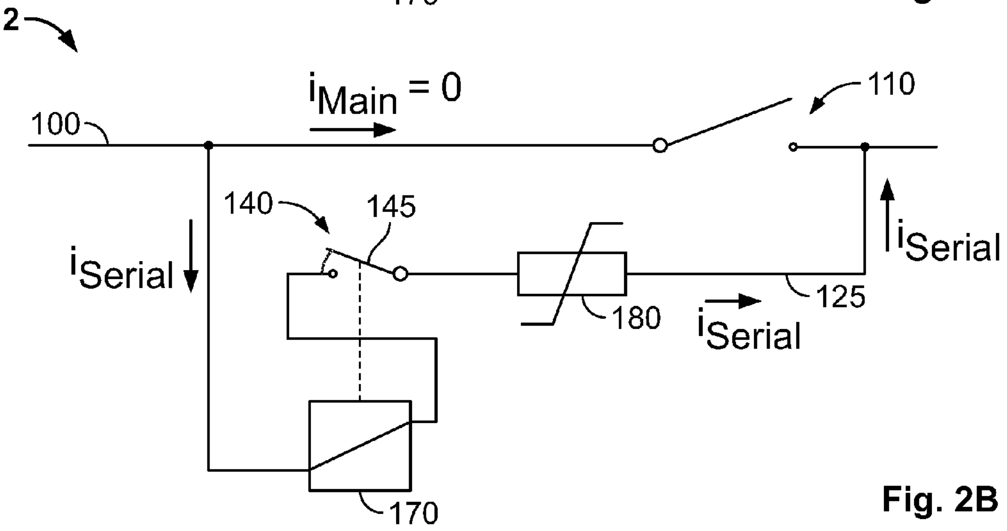
Figure 2C:
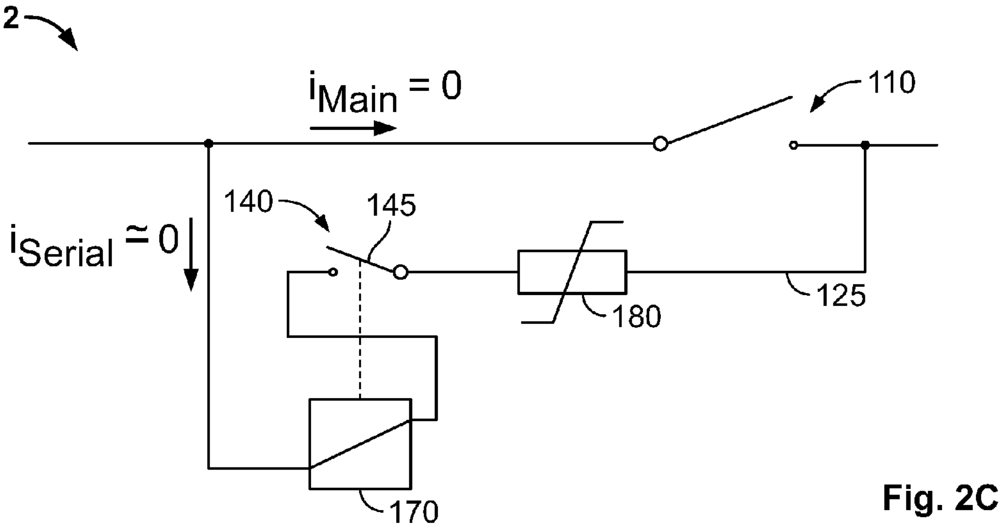

FIGS. 2A, 2B and 2C illustrate an arc suppression circuit 2 at different operating situations according to an exemplary embodiment of the present invention.

As explained above, the auxiliary contact 140, the low resistance coil 170 and the PTC device 180 are connected in series. The series arrangement is connected in parallel to main contact 110 such that when the auxiliary contact 140 is closed and the main relay 120 opens, the energy of the high electric field generated across the opened main contact 110 is shifted to the series arrangement.

FIG. 2A shows an initial configuration in which both the main contact 110 and the auxiliary contact 140 are closed.

In this initial configuration, the PTC device 180 is in the low resistance state. Thus, both the low resistance coil 170 and the PTC device 180 have negligible effect in the current flowing in the load path 100 over the main contact 110. The load current, $I_{main}$, flows essentially over the main contact 110 and the current over the serial arrangement, $I_{serial}$, is negligible.

Now referring to FIG. 2B, when the main contact 110 is operated to open while the auxiliary contact 140 is maintained closed, a current starts to flow through the series arrangement formed by the PTC device 180, the auxiliary contact 140 and the low resistance coil 170, due to the increasing contact voltage drop over the main contacts 110. In this case, the current over the main contact 110, $I_{main}$, is essentially zero and no arcing is produced.

Since initially the PTC device 180 is in the low resistance state, the intensity of the current $I_{serial}$ over the un-tripped PTC device 180 is high enough to keep the auxiliary contact 140 closed via the magnetic flux induced by the low coil 170 in the auxiliary contact 140.

After a device dependent time interval, the PTC device 180 goes from the on-state to the high resistance state.

This situation is illustrated in FIG. 2C. When the PTC device 180 is in the high resistance state, the intensity of the current $I_{serial}$ flowing through the low resistance coil 170 is greatly decreased and is too low to hold the auxiliary contact 140 closed. Thus, the auxiliary contact 140 will automatically open.

Meanwhile, since the intensity of current over the auxiliary contact 140 is substantially reduced with respect to the initial intensity of $I_{serial}$ due to the high resistance state of the PTC device 180, the arcing in the auxiliary contact 140 is also reduced. Thus, the combination of the PTC device 180 with the low resistance coil 170 allows the automatic opening of the auxiliary contact 140 after a given time delay while ensuring that the auxiliary contact 140 is opened only when the current flowing through the contacts has already reached a safe value.

In order to further minimize or suppress arcing in the auxiliary contact 140, the PTC device 180 may be selected based on the rated voltage of the auxiliary contact 140.

Namely, the PTC device 180 may have a maximum high resistance trip current for which the formation of an arc across the auxiliary contact 140, when the auxiliary contact 140 opens at this or lower current intensities, is negligible or even completely suppressed. For instance, the maximum high resistance trip current of the PTC device 180 may be set to a value below 0.5 A.

In addition, the speed at which the PTC device 180 reaches the trip state may be used as a parameter for defining the opening time delay of the auxiliary relay 150.

After the auxiliary contact 140 opens, the tripped PTC device 180 is automatically disconnected from the high voltage circuit and returns to its un-tripped, low resistance state.

Figure 3:
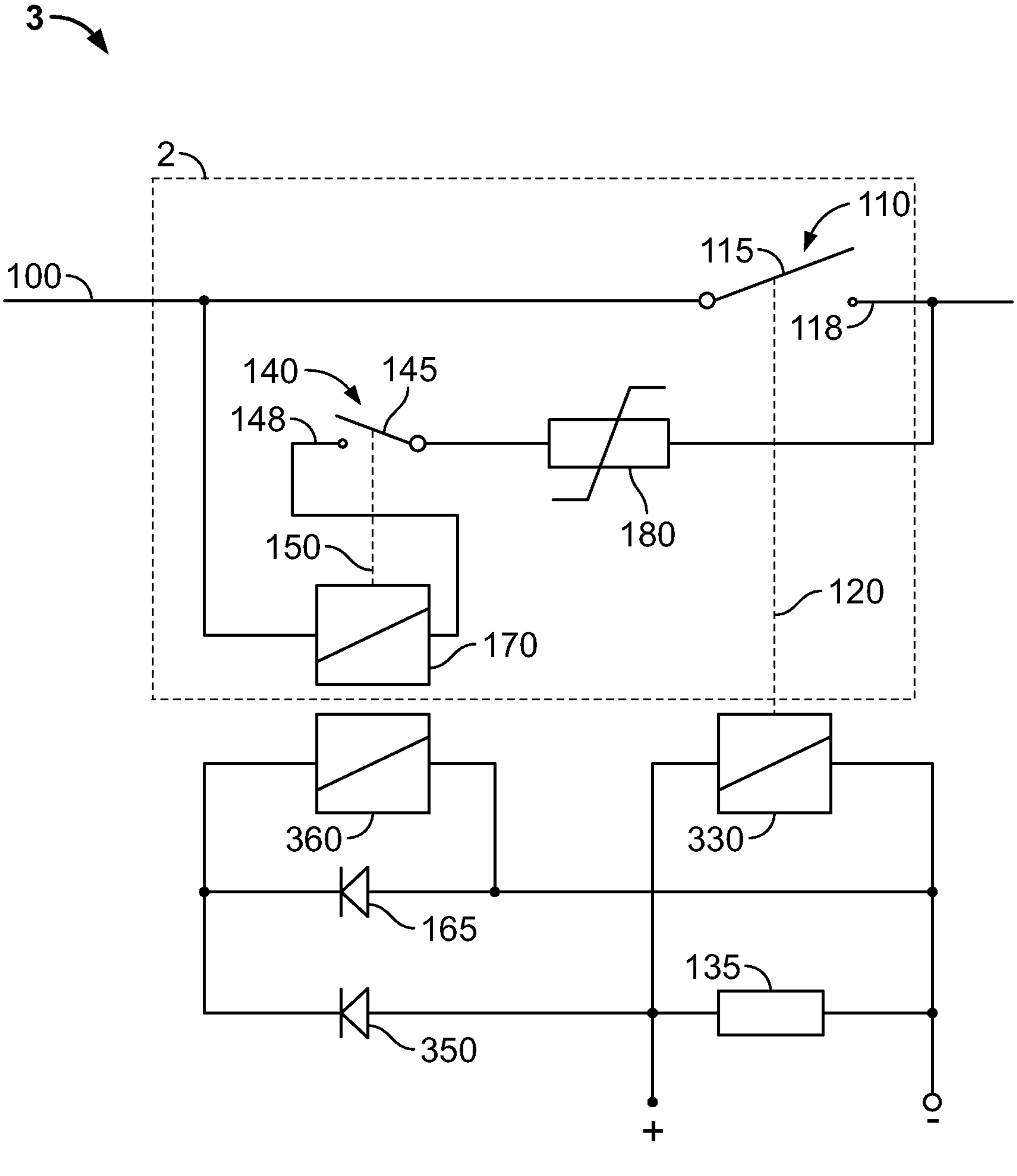
FIG. 3 illustrates a switching device according to a second exemplary embodiment of the present invention.

FIG. 3 illustrates a switching device 3 according to a second exemplary embodiment of the present invention.

The switching device 3 illustrated in FIG. 3 differs from the embodiment shown in FIG. 1 in the arrangement of the main coil of the main relay 120 and the first coil 360 of the auxiliary relay 150, which is a high resistance coil In the present embodiment, the main coil 330 of the main relay 120 is connected in parallel to the first coil 360 of the auxiliary relay 150 for forming a parallel coil arrangement that can be energized by a same voltage circuit (not shown).

Similarly to the embodiment illustrated in FIG. 1, the main coil 330 and the first coil 360 may be each terminated by respective coil protective elements 135, 165 and for the same purposes described in connection with the previous embodiment. Thus, their detailed description shall be omitted.

The current flow in the main coil 330 may be electrically decoupled from the current flow in the high resistance coil 360 of the auxiliary relay 150 by a adding a decoupling element to the parallel coil arrangement. In the illustrated embodiment, the decoupling element is a diode 350 that is connected in series with the high resistance coil 360 of the auxiliary relay 150.

As illustrated in FIG. 3, the decoupling diode 350 is reverse biased when an energizing voltage is applied to the positive (+) and negative (−) terminals of the parallel coil arrangement, thus, allowing the flow of energizing current to both the main coil 330 and the high resistance coil 360 of the auxiliary relay 150. On the other hand, the decoupling diode 350 prevents flow of current from one coil to the other, which could occur for instance, when the energizing voltage is disconnected and magnetic induction is still stored in the coils.

Similarly to the embodiment illustrated in FIG. 1, this configuration also allows using the same external voltage circuit for operating the main relay 120 and the auxiliary relay 150. In addition, a single energizing voltage is sufficient for energizing each of the two coils.

Since for most applications, both coils of the auxiliary relay 150 will be laying on different potentials, where the current sensitive coil 170 is directly connected to a high voltage potential and the voltage sensitive coil 160, 360 is directly connected to a low voltage potential, both potentials need to be strictly insulated from each other.

For such applications, the dual coil relay 150 is then provided with a dielectric insulation between the two coils (not shown) using any suitable techniques known in the art.

Figure 4:
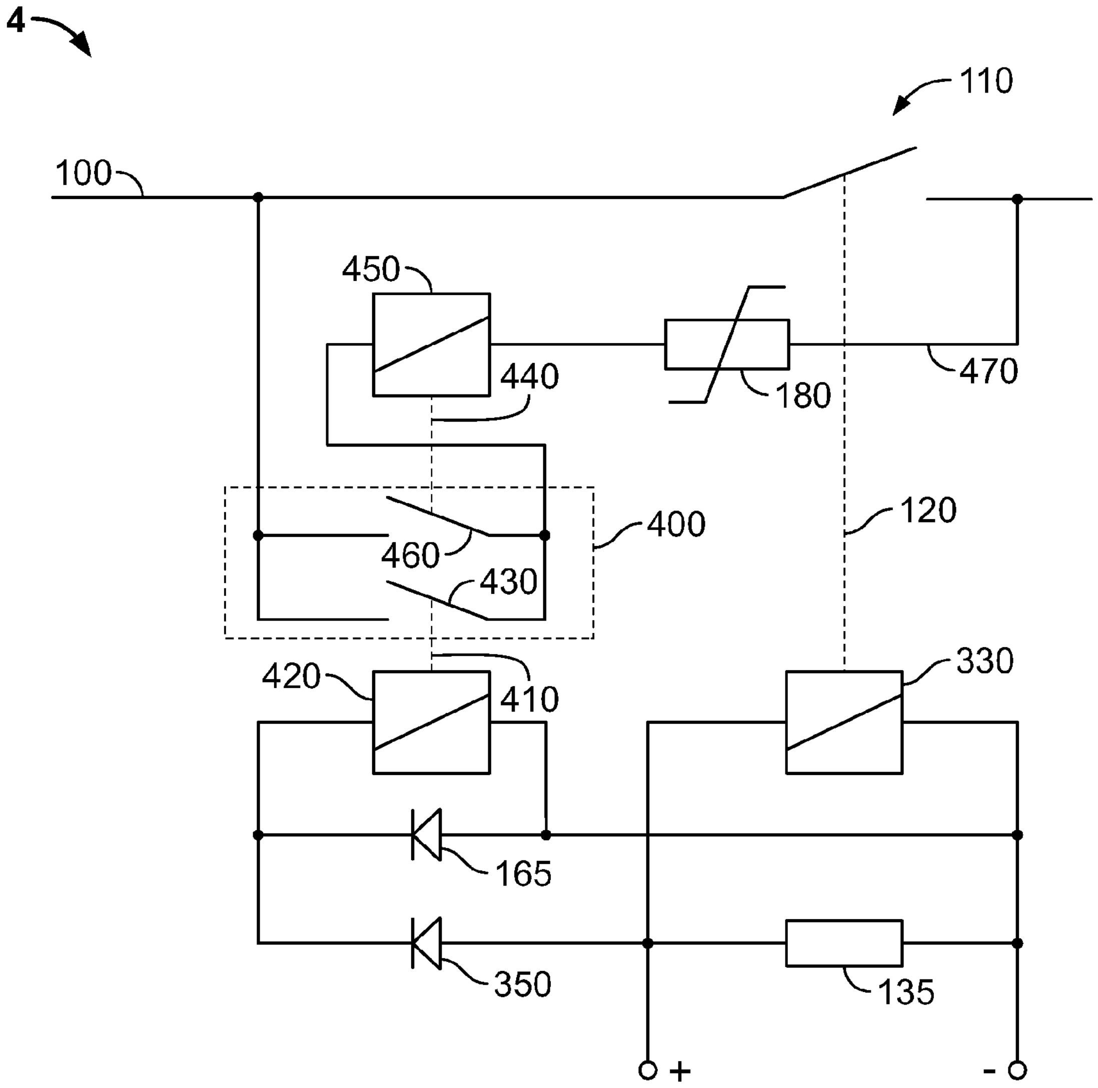
FIG. 4 illustrates a switching device according to a third exemplary embodiment of the present invention.

FIG. 4 illustrates a switching device 4 according to a third exemplary embodiment of the present invention.

The switching device 4 of the present embodiment differs mainly from the previous embodiments in the auxiliary switching mechanism that is used for reducing and/or avoiding arcing in the main switch 110.

In particular, the switching device 4 comprises the same main switching mechanism of the former embodiments. Therefore, its description will be omitted.

In the previous embodiments, the auxiliary switching mechanism is based on a dual coil relay 150 that operates a single auxiliary contact 140 with both a voltage sensitive coil 160, 360 and a current sensitive coil 170 in the same component.

As mentioned above, this configuration requires a sufficient dielectric insulation between the two coils (voltage sensitive coil=low voltage potential/current sensitive coil=high voltage potential), which might be difficult to realize depending on the specific characteristics and intended applications of the switching device. In particular, the dielectric insulation might not be easy to realize inside one component, especially if this component should be small.

The present embodiment transfers the functions of the voltage and current sensitive coils of the dual coil relay 150 to separate relays so that dielectric insulation between coils is no longer required.

As shown in FIG. 4, the auxiliary switching mechanism of the switching device 4 comprises a first auxiliary relay 410 with a voltage sensitive coil 420 (first coil) and a first auxiliary contact 430 that is operated by the first coil 420 and a second auxiliary relay 440 with a current sensitive coil 450 (second coil) and a second auxiliary contact 460 that is operated by the second coil 450. Thus, the voltage sensitive coil 420 and the current sensitive coil 450 no longer operate the same auxiliary contact such as in the former embodiments but each operate a respective contact. This configuration also has the advantage that a standard relay can be used for the first auxiliary relay 410.

The first and second auxiliary contacts 430, 460 are connected in parallel, which can be seen as forming an auxiliary switch 400 that is connected in series with the second coil 450 and a PTC device 180 to form a bypass circuit 470. The bypass circuit 470 is connected in parallel to the main switch 110 so as to provide a function similar to the bypass circuit 125 with the single auxiliary contact 140 of the former embodiments. The operation of the bypass circuit 470 will be described later.

In the present embodiment, the coil terminals of the first auxiliary relay 410 are connected to the main coil 330 of the main relay 120 such as to form a parallel coil arrangement similar to the embodiment illustrated in FIG. 3. The respective coils may also be electrically decoupled by a decoupling diode 350. The first auxiliary relay 410 and the main relay 120 can then be energized and controlled by the same voltage circuit (not shown). This also allows coordinating in time the operation of the main relay 120 and the first auxiliary relay 410.

Alternatively, the coils of the main relay 120 and first auxiliary relay 410 may be connected according to the serial coil arrangement described with reference to FIG. 1.

The main coil 330 and the first resistance coil 420 may also be terminated by respective coil protective elements 135, 165 similarly to the embodiments illustrated in FIG. 1 or 3 and for the same purposes. Thus, their detailed description shall be omitted.

The operation of the auxiliary switching mechanism will now be described. The bypass circuit 470 is connected in parallel to the main contact 110 such as to deviate to the bypass 470 the energy produced by the high electric field established across the main contact 110 when it opens.

Initially, the PTC device 180 is then in a low resistance state, and both the main contact 110 and the first auxiliary contact 430 are maintained closed by the energizing voltage applied to the main coil 330 and the first coil 420, respectively.

The current flowing through the PTC device 180, the second coil 450 and the first auxiliary contact 430 is then negligible in comparison to the current flowing over the main contact 110. Namely, the current through the second coil 450 is not sufficient for generating an electromagnetic force for closing the second auxiliary contact 460, which remains opened.

When the energizing coil voltage is set to zero for opening the main relay 120, the first auxiliary relay 410 opens with a certain time delay with respect to the main relay 120 due to the diode 165 that causes the magnetic induction stored in the first coil 420 to decrease at a slower rate than in the main coil 330. Thus, the electromagnetic force produced by the first coil 420 and which actuates only on the first auxiliary contact 430 ceases after a certain elapsed time.

This time delay is however sufficient for establishing a current flow over the bypass 470, thereby avoiding arcing effects at the opened main contact 110.

Due to the flow of current established over the bypass 470, the second coil 450 of the second auxiliary relay 440 generates an electromagnetic force that forces the second contact 460 to close. Thus, even when the first auxiliary relay 410 opens after the given elapsed time, the flow of current can be maintained over the bypass circuit 470 by the now closed second auxiliary contact 460.

The second auxiliary contact 460 remains closed until the PTC device 180 changes from the low resistance state to the high resistance state. Similarly to the previous embodiments, when the PTC device 180 changes into the high resistance state, the intensity of the current flowing through the second coil 450 is greatly reduced until it becomes too low to hold the second auxiliary contact 460 closed. The current intensity is then at also a level for which no arcing effects are produced.

At this time, the second auxiliary contact 460 opens, which causes the load circuit to be definitely disconnected from the high voltage power supply. It also allows the PTC device 180 to return to the low resistance state.

Thus, similarly to the previous embodiments, the second auxiliary relay 440 opens automatically when the current flowing through the contacts has reached a value for which no arcing effect is produced or is significantly reduced.

The main contact 110 and the bypass circuit 470 with the double auxiliary contacts provide an alternative arc suppression circuit 5 that can be connected in series with a load path for interrupting a high voltage applied on the load path and which reduces and/or suppresses arcing at the switching contacts.

As will be apparent for those skilled in the art, many modifications and/or combinations of the embodiments described above may be envisaged without departing from the scope of the present invention.

For instance, although the switching device of the present invention has been described as comprising a main relay and an auxiliary relay that are energized by the same external voltage circuit, the main and auxiliary relays may be provided as independent, separate electrical circuits that are energized by separate voltage circuits. Another modification of the switching device may be envisaged, in which the main contact is operated by forms other than a main relay, for instance, by manual operation. In this case, the main relay may be omitted and/or substituted by the alternative operating mechanism of the main switch, and the auxiliary relay implemented so that the voltage energizing the first coil of the auxiliary relay is set to zero shortly after the main switch is operated to be opened.

In addition, although the present invention has been described in the context of high voltage relays, the arc suppression circuit of the present invention may be advantageously used in switching devices other than high voltage relays and in which the reduction and/or suppression of arcing effects in the mechanical switches is an important factor for extending the lifetime and reliability of the switching devices.

The invention claimed is:

1. A switching device, comprising:

a main switching mechanism comprising a main switch for electrically interrupting a flow of current through a load path;

an auxiliary switching mechanism comprising an auxiliary switch, a first coil for operating the auxiliary switch via an energizing coil voltage and a second coil that is connected in series with the auxiliary switch and the PTC device, the second coil being adapted to maintain the auxiliary switch closed during said given time interval after the main switch is opened; and a PTC device connected with the auxiliary switch in a series arrangement, the series arrangement being connected in parallel to the main switch;

wherein the auxiliary switching mechanism is adapted to maintain the auxiliary switch closed during a given time interval after the main switch is operated to open, the given time interval depending on a transition of the PTC device from a low resistance state to a high resistance state.

2. A switching device according to claim 1, wherein the auxiliary switching mechanism is adapted to open the auxiliary switch when the PTC device trips to the high resistance state.

3. A switching device according to claim 1, wherein the PTC device has a maximum high resistance trip current such that arcing is suppressed in the auxiliary switch at a current intensity below said maximum high resistance trip current.

4. A switching device according to claim 1, wherein the main switching mechanism and the main switch are provided as a main relay.

5. A switching device according to claim 4, wherein the main relay comprises:

a main coil for operating the main switch via an energizing coil voltage; and a main coil protective element connected to the terminals of the main coil and adapted to control the decay of magnetic inductance stored in the main coil when the energizing coil voltage is disconnected.

6. A switching device according to claim 5, wherein the main coil and the first coil are voltage sensitive coils.

7. A switching device according to claim 6, wherein the main coil and the first coil are connected in a serial manner such that they are energized by a single energizing voltage circuit.

8. A device according to 6, wherein:

the main coil and the first coil are connected in a parallel manner such that each coil is energized with a same energizing voltage, and the device further comprises a decoupling element connected in serial with the first coil and adapted to electrically decouple the main coil and the first coil when the energizing voltage is disconnected.

9. A switching device according to claim 1, wherein the auxiliary switching mechanism comprises:

a first coil protective element connected to the terminals of the first coil and adapted to control the decay rate of the magnetic inductance stored in the first coil when the energizing coil voltage is set to zero.

10. A switching device according to claim 1, wherein the auxiliary switching mechanism is provided as a dual coil relay that comprises the auxiliary switch, the first coil and the second coil.

11. A switching device according to claim 1, wherein:

the auxiliary switching mechanism is provided as a first auxiliary relay and a second auxiliary relay;

the first auxiliary relay comprises the first coil and a first auxiliary contact that is operated by the first coil;

the second auxiliary relay comprises the second coil and a second auxiliary contact that is operated by the second coil; and the first auxiliary contact and the second auxiliary contact are connected in parallel to form the auxiliary switch.

12. A switching device according to claim 1, wherein the second coil is a current sensitive coil.

13. A contact protection circuit for arc suppression, comprising:

a main switch for interrupting a flow of current through a load path of an electrical circuit;

an auxiliary switch;

a PTC device; and a current sensitive coil adapted to operate the auxiliary switch;

wherein the auxiliary switch, the PTC device and the current sensitive coil are connected in a series arrangement, and the series arrangement is connected in parallel to the main switch; and wherein if the main switch is operated to interrupt the flow of current through the load path while the auxiliary switch is closed, the auxiliary switch is maintained closed by the current sensitive coil during a given time interval after the main switch opens, wherein the given time interval depends on a transition of the PTC device from a low resistance state to a high resistance state.

14. A switching device, comprising:

a main switching mechanism comprising a main switch for electrically interrupting a flow of current through a load path, the main switching mechanism and the main switch being provided as a main relay comprised of:

a main coil for operating the main switch via an energizing coil voltage; and a main coil protective element connected to the terminals of the main coil and adapted to control the decay of magnetic inductance stored in the main coil when the energizing coil voltage is disconnected;

an auxiliary switching mechanism comprising an auxiliary switch; and a PTC device connected with the auxiliary switch in a series arrangement, the series arrangement being connected in parallel to the main switch;

wherein the auxiliary switching mechanism is adapted to maintain the auxiliary switch closed during a given time interval after the main switch is operated to open, the given time interval depending on a transition of the PTC device from a low resistance state to a high resistance state.

15. A switching device, comprising:

a main switching mechanism comprising a main switch for electrically interrupting a flow of current through a load path;

an auxiliary switching mechanism comprising:

an auxiliary switch;

a first coil for operating the auxiliary switch via an energizing coil voltage; and a first coil protective element connected to the terminals of the first coil and adapted to control the decay rate of the magnetic inductance stored in the first coil when the energizing coil voltage is set to zero;

a PTC device connected with the auxiliary switch in a series arrangement, the series arrangement being connected in parallel to the main switch; and wherein the auxiliary switching mechanism is adapted to maintain the auxiliary switch closed during a given time interval after the main switch is operated to open, the given time interval depending on a transition of the PTC device from a low resistance state to a high resistance state.

* * * * *